United States Patent
Phillips et al.

(10) Patent No.: US 10,579,835 B1
(45) Date of Patent: Mar. 3, 2020

(54) SEMANTIC PRE-PROCESSING OF NATURAL LANGUAGE INPUT IN A VIRTUAL PERSONAL ASSISTANT

(71) Applicant: SRI International, Menlo Park, CA (US)

(72) Inventors: Aaron B. Phillips, Menlo Park, CA (US); Necip F. Ayan, Palo Alto, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 14/253,503

(22) Filed: Apr. 15, 2014

Related U.S. Application Data

(60) Provisional application No. 61/826,372, filed on May 22, 2013.

(51) Int. Cl.
  *G06F 40/30* (2020.01)
  *G06F 40/40* (2020.01)

(52) U.S. Cl.
  CPC .............. *G06F 40/40* (2020.01); *G06F 40/30* (2020.01)

(58) Field of Classification Search
  CPC .. G06F 17/27; G06F 17/2785; G06F 17/3087; G10L 15/22
  USPC ............................ 704/9, 500, 207, 4, 934, 2
  See application file for complete search history.

(56) References Cited

U.S. PATENT DOCUMENTS

| | | | |
|---|---|---|---|
| 5,386,556 A * | 1/1995 | Hedin .................... | G06F 17/271 |
| 5,652,897 A * | 7/1997 | Linebarger .......... | G10L 15/1822 |
| | | | 704/1 |
| 7,027,974 B1 * | 4/2006 | Busch .................... | G06F 17/271 |
| | | | 704/4 |
| 7,039,635 B1 * | 5/2006 | Morgan ............. | G06F 17/30637 |
| 7,319,992 B2 * | 1/2008 | Gaos ....................... | G06Q 30/02 |
| | | | 348/E7.05 |
| 7,383,172 B1 * | 6/2008 | Jamieson ............. | G06F 17/2785 |
| | | | 704/9 |
| 9,085,303 B2 * | 7/2015 | Wolverton ............. | B60K 35/00 |
| 2002/0065658 A1 * | 5/2002 | Kanevsky ........... | G06F 16/9574 |
| | | | 704/260 |
| 2003/0154080 A1 * | 8/2003 | Godsey ............... | G10L 19/0018 |
| | | | 704/251 |
| 2003/0163304 A1 * | 8/2003 | Mekuria ............... | G10L 19/005 |
| | | | 704/207 |
| 2004/0181390 A1 * | 9/2004 | Manson ................ | G06F 17/271 |
| | | | 704/2 |

(Continued)

FOREIGN PATENT DOCUMENTS

WO  2011028833 A2  3/2011

OTHER PUBLICATIONS

U.S. Appl. No. 14/253,503, filed Apr. 15, 2014.

(Continued)

*Primary Examiner* — Akwasi M Sarpong
(74) *Attorney, Agent, or Firm* — Hickman Palermo Becker Bingham LLP; Christine E. Orich

(57) ABSTRACT

A computing system is operable as a virtual personal assistant (VPA). Among other things, a semantic preprocessor of the VPA recognizes natural language user input that is intended as a reference to a known semantic type, and creates a semantic interpretation of the natural language input. The semantic interpretation may be used by a natural language understanding module of the VPA.

42 Claims, 5 Drawing Sheets

(56) References Cited

U.S. PATENT DOCUMENTS

| | | | |
|---|---|---|---|
| 2005/0273337 A1* | 12/2005 | Erell | G10L 13/08 704/260 |
| 2006/0129541 A1* | 6/2006 | Morgan | G06Q 10/06 |
| 2006/0265208 A1* | 11/2006 | Assadollahi | G06F 3/0237 704/9 |
| 2007/0073533 A1* | 3/2007 | Thione | G06F 17/279 704/9 |
| 2008/0010058 A1* | 1/2008 | Weng | G06F 17/278 704/9 |
| 2009/0076795 A1* | 3/2009 | Bangalore | G06F 17/2785 704/9 |
| 2009/0150156 A1* | 6/2009 | Kennewick | G06Q 30/0261 704/257 |
| 2009/0240490 A1* | 9/2009 | Kim | G10L 19/005 704/207 |
| 2009/0313240 A1* | 12/2009 | Gile | G06F 17/278 |
| 2010/0312547 A1* | 12/2010 | Van Os | G06F 3/167 704/9 |
| 2012/0016678 A1* | 1/2012 | Gruber | G10L 13/02 704/275 |
| 2012/0084076 A1* | 4/2012 | Boguraev | G06F 17/2735 704/9 |
| 2012/0245944 A1* | 9/2012 | Gruber | G10L 15/22 704/270.1 |
| 2012/0265787 A1* | 10/2012 | Hsu | G06F 17/3064 707/780 |
| 2013/0006645 A1* | 1/2013 | Jiang | H03M 7/3082 704/500 |
| 2013/0054563 A1* | 2/2013 | Heidasch | G06N 99/005 707/711 |
| 2013/0152092 A1* | 6/2013 | Yadgar | G10L 15/19 718/102 |
| 2014/0052680 A1 | 2/2014 | Nitz et al. | |
| 2014/0052681 A1 | 2/2014 | Nitz et al. | |
| 2014/0136013 A1* | 5/2014 | Wolverton | B60K 35/00 701/1 |
| 2014/0136187 A1 | 5/2014 | Wolverton et al. | |
| 2014/0200876 A1* | 7/2014 | Epstein | G06F 17/28 704/2 |
| 2014/0278343 A1* | 9/2014 | Tran | G06F 17/2785 704/2 |
| 2015/0019220 A1* | 1/2015 | Talhami | G10L 15/063 704/244 |

OTHER PUBLICATIONS

U.S. Appl. No. 61/826,372, filed May 22, 2013.
U.S. Appl. No. 13/866,509, filed Apr. 19, 2013.
U.S. Appl. No. 13/891,858, filed May 10, 2013.
U.S. Appl. No. 13/891,864, filed May 10, 2013.
U.S. Appl. No. 13/954,613, filed Jul. 30, 2013.
U.S. Appl. No. 13/966,665, filed Aug. 14, 2013.

* cited by examiner

US 10,579,835 B1

SEMANTIC PRE-PROCESSING OF NATURAL LANGUAGE INPUT IN A VIRTUAL PERSONAL ASSISTANT

CROSS REFERENCE TO RELATED APPLICATIONS

This application claims the benefit of and priority to U.S. Provisional Patent Application Ser. No. 61/826,372, filed May 22, 2013, which is incorporated herein by this reference in its entirety.

BACKGROUND

Computerized systems commonly known as virtual personal assistants ("VPAs") can interact with computing device users in a conversational manner to provide access to electronic information and services. To do this, the VPA needs to be able to correctly interpret conversational user input, execute a task on the user's behalf, determine an appropriate response to the input, and present system output in a way that the user can readily understand and appreciate as being responsive to the input. A complex assortment of software components work together to provide this functionality.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
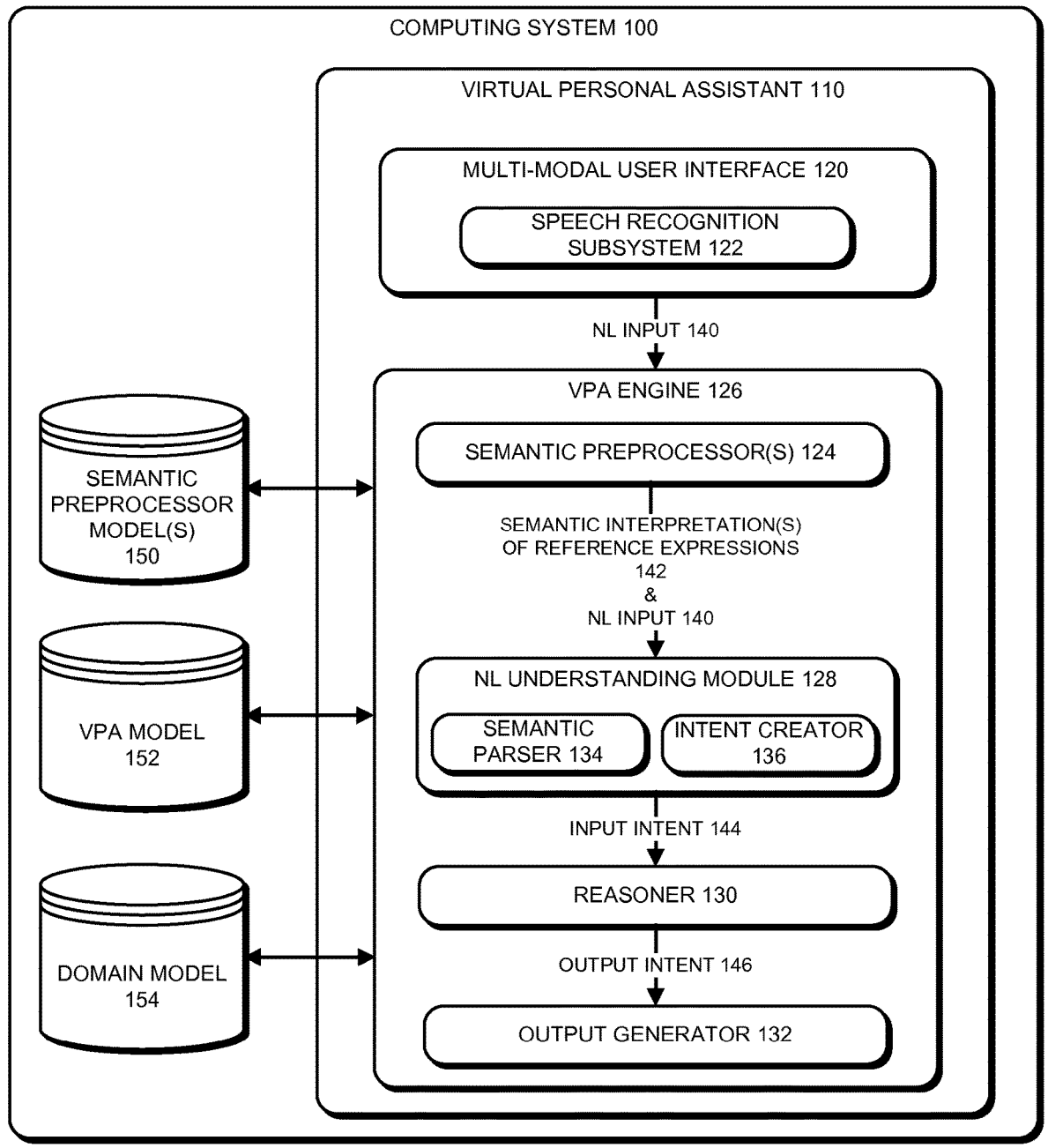
FIG. 1 is a simplified module diagram of at least one embodiment of a virtual personal assistant ("VPA") platform embodied in a computing system as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

In normal, natural language conversation, different people, or even the same person at different times, may vary the words or phrases that they use to refer to the same thing. For instance, people often use a vague, relative, and/or ambiguous expression as a reference to something more specific. Such expressions may be intended to refer to the name of a person, a familial relationship, a location, a date, or a time, for example. Further, people often use general references (e.g., common nouns or noun phrases) to refer to more specific information (e.g., proper nouns, dates, numbers, etc.) where the intended reference can be readily deduced by the listener.

In the context of a virtual personal assistant (VPA) application, in which the VPA, not another person, is the listener, these types of natural language expressions can be problematic. As an example, a VPA user may say to the VPA: "remind me two weeks from today" or "remind me on the tenth" or "remind me a week from next Thursday." All of these variations include a request for the VPA to take an action (e.g., create a reminder) on a particular calendar date. However, in order to execute the requested action (create a reminder), the VPA needs to determine the exact date on which the reminder should occur, based on the current context of the natural language expression. In other words, there are a number of different possible data values that could be associated with the expression, and the correct value depends on the VPA's determination of the current date. The abstract nature of these and other "reference expressions," the potentially infinite number of variations in such expressions, and the fact that many different data values can be associated with such expressions depending on the context, all present challenges to the VPA. The VPA either needs to account for each of the different possible combinations of reference expressions and data values, or the VPA needs to generalize its interpretation of the many possible variations to a manageable number of canonical representations.

As disclosed herein, semantic pre-processing can be performed on natural language input in such a way that the VPA is able to interpret a wide variety of reference expressions using a set of canonical representations (e.g., "semantic types"), yet have enough flexibility to allow the reference expressions to change over time as expressions change or new users are added to the system (as opposed to simply defining a static set of associations between reference expressions and canonical representations). Further, the automated semantic pre-processing techniques disclosed herein allow individual VPA users to define reference expressions that are personal to the user and are therefore established after the users become engaged with the system. Such personalized reference expressions may include, for example, "my son's savings account," "dad's car," "our favorite pub" or personalized shorthand, abbreviations or slang such as "GNO" or "TTYL." Additionally, the semantic preprocessing disclosed herein can accommodate semantic relationships between reference expressions found in the natural language input and semantic types in which the data values or "semantics" that are used to instantiate the semantic type are not statically defined but rather determined by the VPA in the context of the current natural language input.

Further, the semantic preprocessing as disclosed herein is "pre" in the sense that it occurs prior to the full natural language understanding mechanisms used to interpret the entire instance of natural language input (e.g., "sentence level" interpretation). For instance, the disclosed semantic preprocessing may prepare a number of possible preliminary semantic interpretations of an instance of natural language input including a reference expression, which are then analyzed by a natural language understanding module of the virtual personal assistant (using, e.g., artificial intelligence techniques such as statistical parsing). In this way, the disclosed semantic preprocessing can develop one or more "partial" interpretations of various portions of the entire instance of the natural language input, one or more of which may then be selected by the natural language understanding component of the VPA to create a "complete" interpretation of the instance of natural language input (e.g., an "input intent").

In VPA systems that are not equipped with any semantic preprocessors 124 as disclosed herein, reference expressions cannot be pre-identified and resolved but rather each entire instance of natural language input must be processed and interpreted by the natural language understanding module (using, e.g., conventional semantic parsing operations). With conventional natural language understanding modules that do not receive the output of a semantic preprocessor 124, many reference expressions may be left un-interpreted because constructing the natural language understanding module to account for all possible variations of reference expressions and their corresponding semantics is not practical or possible.

Referring now to FIG. 1, a VPA 110 embodied as a computing system 100 includes one or more semantic pre-processors 124. Each semantic preprocessor 124 can prepare a semantically meaningful structured representation of one or more reference expressions for further processing by the VPA 110. Some embodiments of the VPA 110 may include a number of different semantic preprocessors 124, each of which is configured for a different semantic type (e.g., name, number, date, location, relationship, etc.). In other embodiments, however, a single preprocessor 124 may be configured to iteratively handle multiple different semantic types.

For ease of discussion, the term "reference expression" may be used herein to refer to, among other things, a portion of natural language user input (e.g., spoken or text natural language dialog input) that can be interpreted by the VPA 110 as a reference to a type of information or canonical representation that is known by and semantically meaningful to the VPA 110. As such, a reference expression typically contains a noun or noun phrase, such as a subject, object, person, place, or thing, rather than an action, verb or verb phrase. In other words, a reference expression typically includes information that the VPA 110 needs in order to perform an action, rather than specifying the action to be performed, itself. For example, in the phrase, "remind me on the tenth," "remind" corresponds to an action that the VPA 110 can execute (create a reminder), and "on the tenth" may be considered as the reference expression that includes information needed by the VPA 110 to create the reminder. As disclosed herein, a semantic preprocessor 124 can efficiently resolve "on the tenth" to, e.g., "date(04/10/2014)," so that the VPA 110 can continue with its handling of the natural language dialog session without having to ask the user to clarify the meaning of "on the tenth." As well, the semantic preprocessor 124 is able to determine the actual data value that corresponds to the reference expression, "on the tenth" based on the current context of the VPA 110 (e.g., based on the current calendar date) and supply the data value to other modules of the VPA 110.

Relationships between reference expressions and semantic types may be defined by, for example, an application developer or an end user. The relationships between reference expressions and semantic types may be specified according to a particular domain of the VPA 110. For example, a financial services VPA may relate a number of different reference expressions to a semantic type of "bank account," while a travel services VPA may relate a group of reference expressions to a date range or a "destination." Further, if a VPA user has certain phrases, nicknames or abbreviations that he or she uses often, the user can define these relationships explicitly to the VPA 110 or the VPA 110 may learn and establish these relationships over time based on the user's feedback during use of the VPA 110 (by, e.g., a machine learning technique). The relationships between reference expressions and semantic types may be stored in one or more semantic pre-processor models 150, using, e.g., tables, rules, a hierarchy of data objects, an ontology, or other suitable data structure.

The term, "semantic type" may be used herein to refer to, among other things, the specific, semantically meaningful category or type of information that corresponds to one or more different reference expressions. In computer programming terminology, a semantic type can be thought of as corresponding to a class of data objects or entities, or as a parameter name. Stated another way, as used herein, a semantic type represents at least a partial semantic interpretation of one or more reference expressions. To complete a semantic interpretation of a reference expression, a semantic preprocessor 124 may determine, based on the reference expression and the semantic type, one or more semantic units and corresponding semantic data values with which to instantiate the semantic type. In other words, a "semantic unit" as used herein may refer to, among other things, a portion of the natural language input that signifies a data value. A reference expression may be a semantic unit or a reference expression may be made up of multiple semantic units. As used herein, "semantic value" may refer to, among other things, one or more data values or "semantics" determined by the semantic preprocessor 124 to correspond to a semantic unit. For example, if the reference expression is "on next Tuesday," the semantic preprocessor 124 may establish a semantic type of "Date," where the semantic unit is "next Tuesday," and the semantic value is "04/15/2014". Thus, a semantic value may be stated explicitly by the user in the reference expression (in which case the semantic unit and the semantic value may be the same), or the semantic preprocessor 124 may deduce the semantic unit by performing calculations or executing computer logic. For example, if a reference expression includes the statement "2014," a "number" preprocessor 124 may formulate a corresponding semantic interpretation as "number(2014)," where "number" is a semantic type and "2014" is both a semantic unit and a semantic value. On the other hand, if the reference expression is "next Tuesday," a "date" preprocessor 124 may perform a mathematical operation to determine the current date and then add the appropriate number of days to the current date to arrive at next Tuesday's date.

As another example, if the semantic preprocessor 124 finds a reference expression of "three days from Thursday" in the natural language input, both "three days" and "Thursday" could be semantic units that are combined to represent the semantic type date, and the semantic preprocessor 124 may compute the corresponding semantic value by determining Thursday's date (as a numerical value) and adding three days to the numerical value of Thursday's date. Further, sometimes, the semantic types are themselves semantic units. For example, "fifty five" has the semantic units "fifty" and "five" which correspond to semantic types number(50) and number(5), but combined together these yield number(55).

The semantic preprocessor 124 (or a combination of different semantic preprocessors 124) can iteratively process an instance of natural language input to iteratively build up more complex semantic types by combining smaller semantic units. The reference expression "in thirty two days" provides an example. First, a "number" semantic preprocessor 124 may identify the semantic types number(30) and number(2). Next, the number preprocessor 124 may establish the semantic type number (32) by adding 30+2. Then, a "date" preprocessor 124 may instantiate the semantic type date(05/12/2014) by determining today's date and adding 32 days to today's date.

It should be noted that an instance of natural language dialog input 140 may contain multiple reference expressions, and any reference expression may contain more than one semantic type and/or more than one semantic unit. Moreover, multiple different preprocessors may interpret a single reference expression or portions thereof. In TABLE 1 below, a simplified example of a reference expression, semantic types, semantic units, and semantic values for the natural language input phrase "transfer fifty dollars from bto to checking" is shown.

TABLE 1

Reference expression, semantic units, semantic types, and semantic values.
NL Input
"transfer fifty dollars from bto to checking"
Reference Expression
"fifty dollars from bto to checking"

| Semantic Unit | Semantic Type | Semantic Value |
| --- | --- | --- |
| "fifty" | Number | 50 |
| "fifty dollars" | Currency | $50.00 |
| "bto" | Account | 123498765 |
| "checking" | Account | 998761123 |

In the example of TABLE 1, three different semantic pre-processors 124 are used to generate semantic interpretations 142 of the reference expression "fifty dollars from bto to checking" in the NL input phrase, "transfer fifty dollars from bto to checking." First, a "number" preprocessor 124 generates a semantic interpretation of the text, "fifty" as, e.g., number(50), representing a numerical value. Next, a "currency" preprocessor 124 generates a semantic interpretation of the text, "fifty dollars" as currency($50.00), a dollar value. Then, an "account" preprocessor 124 (which may be a domain-specific preprocessor for a banking VPA, for example), generates a semantic interpretation of the text, "from bto," by associating it with an "Account" semantic type and instantiating the account with the actual account number data value, 123498765. The account preprocessor 124 also instantiates the "Account" semantic type in a similar way. The account preprocessor recognizes "bto" as referring to a particular bank account of the VPA user, e.g., as a result of a user-defined relationship specifying the account number and its reference expression or "nickname," bto. The account preprocessor also recognizes "checking" as referring to a specific bank account number, in a similar fashion. The multiple different preprocessors 124 thereby iteratively build a number of different possible semantic interpretations 142, which can be further interpreted and/or used by other modules of the VPA 110. For example, the semantic interpretations 124 may be passed on to an intent creator module 136, described below.

A natural language understanding module 128, or a semantic parser 134, may apply rules or statistical classifiers to the semantic interpretations 142 and algorithmically determine which of the interpretations 142 is most likely to be correct. The order in which the preprocessors 124 are executed may be specified by setting preprocessor priorities or dependencies within the preprocessors 124, or may be specified by the VPA 110, e.g., by an initialization routine of the VPA engine 126.

Referring now in more detail to FIG. 1, the virtual personal assistant (VPA) 110 is embodied as a number of computer applications, modules, executable instructions, and/or data structures, each of which may be implemented in software, hardware, or a combination thereof. The illustrative VPA 110 is configured to receive user-supplied conversational natural language dialog input (alone or in combination with other inputs, as discussed below), preprocess the input, interpret the input, perform one or more actions (e.g., execute system operations such as task flows) based on the VPA's interpretation of the input, and supply a response to the input as a result of the executed system operations, where the response may include, among other things, system-generated natural language dialog outputs.

The components of the illustrative VPA 110 shown in FIG. 1 are described more fully below. Additionally, various features of virtual personal assistant platforms developed by SRI International are described in a number of other patent applications of SRI International. Such patent applications include, for example, Tur et al., PCT International Application Publication No. WO 2011/028833, entitled "Method and Apparatus for Tailoring Output of an Intelligent Automated Assistant to a User;" Yadgar et al., U.S. patent application Ser. No. 13/314,965, filed Dec. 18, 2011, entitled "Generic Virtual Personal Assistant;" Nitz et al., U.S. patent application Ser. Nos. 13/585,003 and 13/585,008, filed Aug. 14, 2012, both entitled "Method, System, and Device for Inferring a Mobile User's Context and Proactively Providing Assistance;" Wolverton et al., U.S. patent application Ser. Nos. 13/678,209 and 13/678,213, filed Nov. 15, 2012, both entitled "Vehicle Personal Assistant;" Ayan et al., U.S. patent application Ser. No. 13/866,509 filed Apr. 19, 2013, entitled "Clarifying Natural Language Input Using Targeted Clarification Questions;" Kalns, et al., U.S. patent application Ser. Nos. 13/891,858 and 13/891,864, both filed May 10, 2013, both entitled, "Rapid Development of Virtual Personal Assistant Applications;" Kalns et al., U.S. patent application Ser. No. 13/954,613, filed Jul. 30, 2013, entitled "Using Intents to Analyze and Personalize a User's Dialog Experience with a Virtual Personal Assistant;" and Nitz et al., U.S. patent application Ser. No. 13/966,665, filed Aug. 14, 2013, entitled "Providing Virtual Personal Assistance with Multiple VPA Applications," all of which are incorporate herein by reference to provide background information relating to the design, development, operation and use of exemplary virtual personal assistant applications. Such references are provided for illustration only, and aspects of this disclosure are by no means limited to use in connection with virtual personal assistant platforms developed by SRI International. Rather, the features disclosed herein are applicable to a wide variety of different types of computer systems and devices that enable user-directed spoken natural language dialog as an input modality, including mobile systems such as APPLE SIRI, GOOGLE NOW, and/or others.

Figure 5:
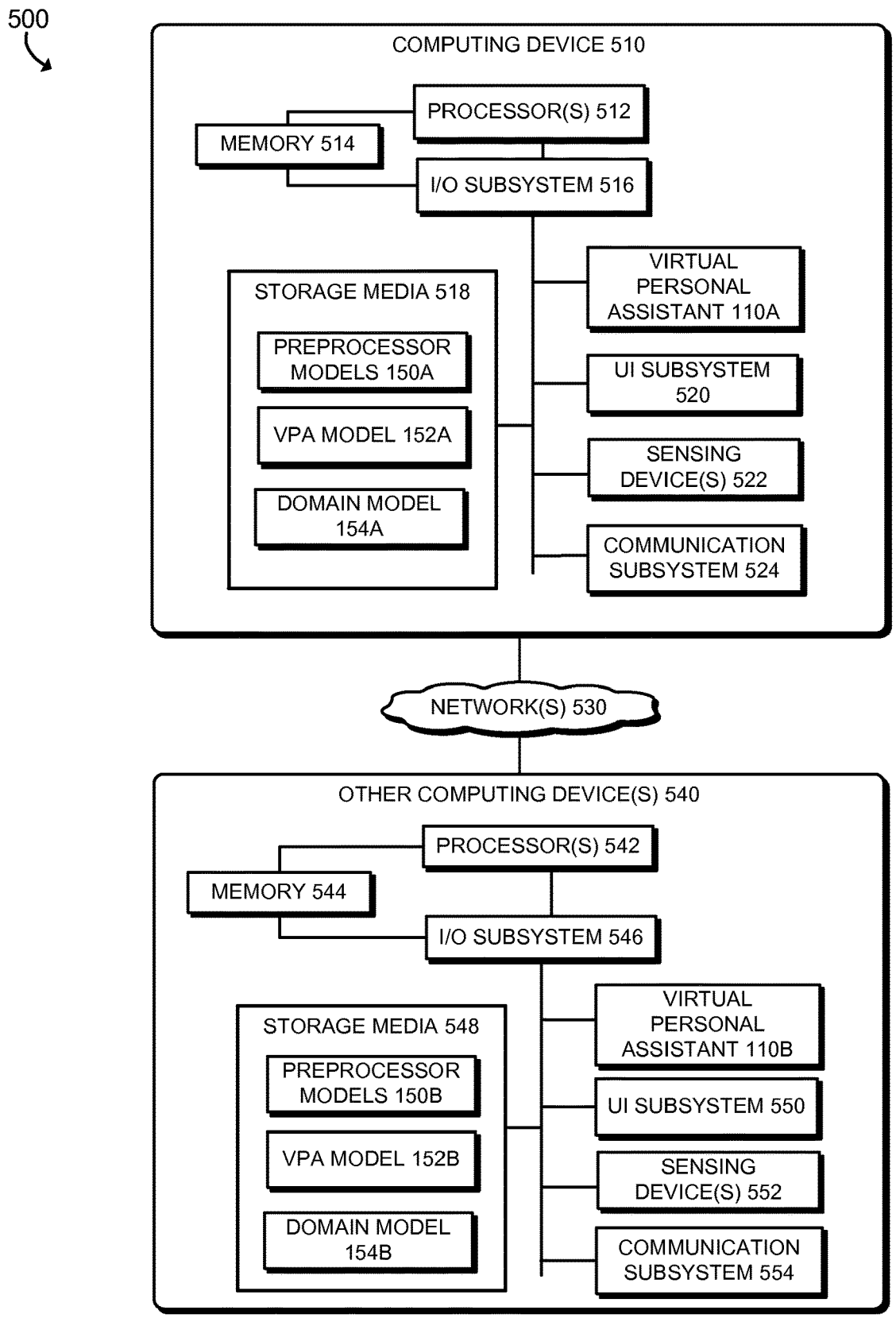
FIG. 5 is a simplified block diagram of at least one embodiment of a computing environment in which the VPA of FIG. 1 may be implemented.

As shown in FIG. 1, the illustrative VPA 110 includes a multi-modal user interface 120, which receives instances of natural language (NL) input 140 of a VPA user from time to time and supplies each instance of the natural language input 140 to a VPA engine 126. The VPA engine 126 or the VPA 110 more generally is communicatively coupled to a VPA model 152 and a domain model 154, which the VPA engine 126 accesses from time to time as needed to interpret and/or process the NL input 140 during a natural language dialog session with a VPA user. In general, the modules and data structures of the VPA 110, and their respective submodules and other computerized components, are in communication with each other as needed by suitable communication mechanisms, which may be enabled by an application programming interface, operating system components, a network communication subsystem, and/or other components of the computing system 100. An exemplary computing environment for the computing system 100 in which the VPA 110 may be embodied is shown in FIG. 5, described below.

If the NL input 140 includes natural language speech, the multi-modal interface 120 captures the user's spoken natural language dialog input with a microphone or other audio input device of the computing system 100, and utilizes an automated speech recognition (ASR) subsystem 122 to convert the speech inputs into natural language text. There are many suitable automated speech recognition (ASR) systems that are commercially available; one example is the DYNASPEAK system, available from SRI International. While the speech recognition subsystem 122 is shown in FIG. 1 as a component of the multi-modal user interface 120, in other embodiments, the speech recognition subsystem 122 may be a separate or external (e.g. third party) component with which the VPA 110 is communicatively coupled.

The multi-modal user interface 120 can receive and supply to the VPA engine 126 other forms of input in addition to the NL input 140, such as non-dialog human-generated inputs (e.g., non-dialog keyboard, keypad, or touch screen inputs, mouse clicks, taps, gestures, and/or others), computer application inputs (e.g., data and/or instructions passed by another computer application to the VPA 110, through an application programming interface, for example), and/or sensor inputs (e.g., wired or wireless electrical signals embodying sensed information such as geographic location, motion, temperature, activity, biometric data, etc.). In some cases, the multi-modal interface 120 may capture "off-device" body movements or other gesture-type inputs (such as hand waves, head nods, eye movements, etc.) by, e.g., a camera, motion sensor and/or kinetic sensor, which may be integrated with or otherwise in communication with the computing system 100. Thus, while the VPA 110 is often mainly concerned with processing the NL input 140, other forms of input may be used by the VPA 110 to aid in its understanding of the NL input 140 or to determine a suitable response to the NL input 140. Components of the multi-modal user interface 120 process the various inputs and provide machine-readable representations of such inputs to the VPA engine 126. For example, components of the multi-modal user interface 120 may convert analog signals to digital form, translate mouse clicks or gestures to a text command or data, or process data and/or instructions received from other computer applications.

Whether originating as speech or text, the instances of NL input 140 are transmitted, passed, or otherwise made available to the VPA engine 126 for further processing in order to continue the dialog session with the VPA user or to provide information or an automated service to the VPA user in response to the current round of NL input 140. The illustrative VPA engine 126 includes the semantic preprocessor(s) 124, a natural language understanding module 128, a reasoner 130, and an output generator 132. In the VPA engine 126, each of the semantic preprocessors 124 preprocesses the NL input 140 using a corresponding semantic preprocessor model 150 before the NL input 140 is analyzed by the NL understanding module 128 (and prior to the processing that is performed by the reasoner 130 and the output generator 132 in relation to the NL input 140). Further details of the structure and operation of an illustrative semantic preprocessor 124 are described below with reference to FIG. 2.

The NL understanding (NLU) module 128 receives and processes the semantic interpretation(s) 142 that are prepared by the semantic preprocessor(s) 124 and the instance of NL input 140 that corresponds to the semantic interpretation(s) 142, using artificial intelligence-based techniques. The NLU module 128 analyzes the semantic interpretations 142 and the NL input 140, and formulates an input intent 144, which it passes to the reasoner 130. As used herein, an "input intent" may refer to, among other things, a structured representation of the semantic interpretation of the complete NL input 140 (e.g., the entire NL phrase, including the reference expression(s) that have been previously analyzed by the semantic pre-processor(s) 124). For example, the input intent 144 may be formulated as a data structure (e.g., a map of key value pairs or XML data structure), which indicates the action to be executed by the VPA 110 in response to the NL input 140 as well as the information that the VPA 110 needs to execute that action.

The NLU module 128 may select a semantic interpretation 142 to supply the information needed to execute the requested action (e.g., to fill an argument or "slot" of the input intent 144). To do this, a semantic parser 134 may apply rules and/or statistical classifiers to select the most likely correct semantic interpretation 142. An intent creator module 136 then assigns the semantic interpretation 142 selected by the semantic parser 134 to the appropriate slot or argument of the input intent 144. To illustrate, in the example of TABLE 1, the semantic parser 134 may select the "Currency($50.00)" semantic interpretation 142 of the reference expression "fifty dollars" (rather than the "Number (50)" semantic interpretation 142), and the intent creator 136 may develop an input intent 144 such as "Transfer(amount=$50.00, source=123498765, destination=998761123)."

In VPA systems that are not equipped with any semantic preprocessors 124, reference expressions cannot be pre-identified and resolved but rather each entire instance of NL input 140 is processed and interpreted by the NL understanding module 128 using conventional semantic parsing operations. With conventional NL understanding modules 128 that do not receive the output of a semantic preprocessor 124, many reference expressions may be left un-interpreted because constructing the NLU 128 to account for all possible variations of reference expressions and their corresponding semantics is not practical or possible. Illustrative examples of natural language understanding components that may be used or adapted for use in connection with or as a component of the natural language understanding module 128 are described in the aforementioned patent applications of SRI International.

The reasoner 130 analyzes the input intent 144 and executes any system operations (e.g., task flows) that are needed to prepare a system response to the input intent 144. The illustrative reasoner 130 generates a structured representation of the VPA 110's response to the input intent 144, the output intent 146. The reasoner 130 passes the output intent 146 to the output generator 132. The output generator 132 prepares and presents the type of system output that the reasoner 130 determines (e.g., based on a high degree of statistical confidence) is likely appropriate based on the input intent 144 and/or other factors. The output generator 132 may include a natural language generator (NLG) module, which may be used to generate a natural language version of the system-generated output. A speech synthesizer or text-to-speech (TTS) module may be used to convert natural-language text generated by the natural-language generator to speech output (e.g., machine-produced speech using a human or humanlike voice). The speech output may be played through a speaker of the computing system 100. Alternatively or additionally, the output generator 132 may present visual material (e.g., text, graphics, or video), tactile notifications, and/or other forms of output, which may be presented using a display screen or other output mechanism of the computing system 100.

The semantic preprocessor models 150, the VPA model 152 and the domain model 154 are each embodied to include a knowledge base of components that enable the VPA 110 to understand, reason about (using, e.g., artificial intelligence techniques), and respond to the natural language dialog inputs 140 that it receives. As such, each or any of the models 150, 152, 154 may include information, data structures, computer program logic or other executable components, or a combination thereof. Components of the models 150, 152, 154 may be embodied as mathematical equations, rules, templates, data, arguments, parameters, and/or computer code. In some embodiments, the components of the models 150, 152, 154 include predefined grammars, intents, task flows, and/or natural language response templates.

In some embodiments, a semantic preprocessor model 150 may be embodied as a domain-specific or user-specific semantic preprocessor model. For instance, one semantic preprocessor 124 may be directed to handling dates (e.g., converting "next year" to "Date(01/01/2015-12/31/2015), whereas another semantic preprocessor 124 may be directed to handling time (e.g., converting "half past nine" to "<time: 09:30:00>").

Other embodiments of the VPA 110 may include additional components or modules not mentioned herein, such as additional domain-specific VPA components. Additionally, some components described herein as being embodied as part of the VPA 110 or the VPA engine 126 may, in other embodiments, be incorporated into other parts of the VPA 110 or may be external to the VPA 110 and accessed by the computing system 100 over a communication network. For example, in some embodiments, the semantic parser 134 may be combined with or integrated into one or more of the semantic preprocessors 124.

Figure 2:
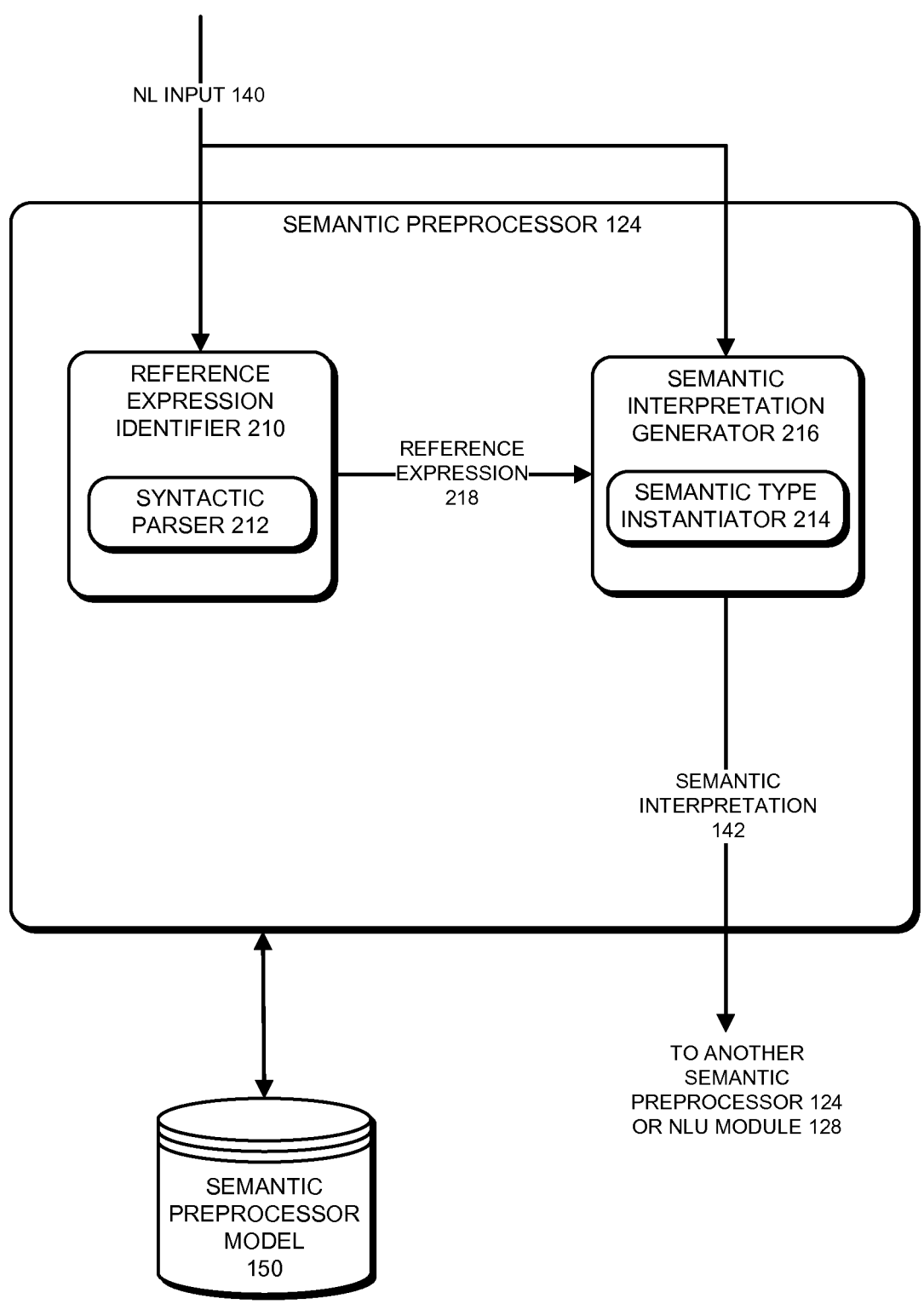
FIG. 2 is a simplified module diagram of at least one embodiment of the semantic preprocessor of FIG. 1.

Referring now to FIG. 2, an embodiment of the semantic preprocessor 124 includes a reference expression identifier module 210 and a semantic interpretation generator 216. The illustrative reference expression identifier 210 includes a syntactic parser 212. The illustrative semantic interpretation generator 216 includes a semantic type instantiator 214 (which may be embodied as a "unit level" semantic parser; whereas the semantic parser 134 may be embodied as a "sentence level" semantic parser). The semantic preprocessor 124 is communicatively coupled to a corresponding semantic preprocessor model 150. While shown as individual modules or components in FIG. 2, it should be understood that any or all of the modules 210, 212, 214, 216 of the semantic preprocessor 124 may be embodied as separate components or as a single component, or simply as portion of computing programming code (e.g., Java code). For example, the reference expression identifier 210 and the semantic interpretation generator 216 may be implemented as a single module (e.g., the operations of the modules 210, 216 may be performed concurrently or in parallel, as opposed to sequentially). More generally, in some embodiments, the modules 210, 212, 214, 216 may be "tightly coupled" in the sense that the functions performed by these modules are performed simultaneously (e.g., concurrently or in parallel). For example, the reference expression identifier 210 may execute on the NL input 140 to identify a number of possible (or "candidate") reference expressions 218, and at the same time, the semantic interpretation generator 216 may be executing on the reference expressions 218 to (e.g., iteratively) build the semantic interpretation 142.

The semantic interpretation generator 216 may perform a consistency check to check for consistency between a syntactic unit of the reference expression 218 identified by the reference expression identifier 210 and a semantic unit of the reference expression 218, which is identified by the semantic interpretation generator 216. For instance, a consistency check may be executed by the semantic interpretation generator 216 to determine whether a semantic unit of the reference expression 218 makes sense syntactically and vice versa. The semantic preprocessor 124 outputs the semantic interpretation 142 (i.e., an instantiation of a valid semantic type). The semantic preprocessor 124 may pass the semantic interpretation 142 to another semantic preprocessor 124 for additional preprocessing, or provide the semantic interpretation 142 to the NLU module 128 for intent creation, as described herein.

The reference expression identifier 210 identifies one or more reference expressions 218 in the NL input 140. To do this, the reference expression identifier 210 may execute a syntactic parser 212 to create a syntactic parse tree of the NL input 140. As such, the reference expressions 218 (e.g., syntactic units) identified by the reference expression identifier 210 may include portions of the NL input 140 that are temporally spaced, including a sequential or non-sequential set of words or other utterances. For example, a reference expression 218 may include a single word, a phrase, or a group of words that has other words or utterances (e.g., disfluencies, pauses, etc.) interspersed between the words of the reference expression 218. Further, as shown in the example of TABLE 1, the same word or words may be included in different reference expressions. Where the reference expression identifier 210 identifies multiple different possible reference expressions in an NL input 140, each such reference expression 218 may be referred to as a "candidate reference expression."

In the illustrative embodiment, the semantic interpretation generator 216 semantically analyzes the NL input 140 simultaneously (e.g., concurrently or in parallel) with the syntactic analysis performed by the reference expression identifier 210, although such analyses may be performed sequentially in other embodiments. The illustrative semantic interpretation generator 216 also analyzes the reference expressions 218 output by the reference expression identifier 210 (e.g., the syntactic units output by the syntactic parser 212). The semantic interpretation generator 216 identifies semantic units in the NL input 140 and/or the reference expressions 218, and associates each of the identified semantic units with its corresponding semantic type. In other words, the semantic interpretation generator 216 recognizes one or more semantic units of the NL input 140 and/or reference expressions 218 as referring to at least one of the semantic types (e.g., date, title, address, unit of measure, currency, nickname, etc.) indicated by the semantic preprocessor model 150 used by the semantic preprocessor 124. The semantic types maybe defined as, for example, object classes in Java code.

The semantic type instantiator 214 instantiates the recognized semantic type. To do this, the semantic type instantiator 214 may use a synchronous context-free grammar (S-CFG) to define the associations between the semantic unit, the corresponding semantic type, and the corresponding semantic value. The semantic type instantiator 214 populates the attribute(s) of the semantic type with one or more semantic values corresponding to the semantic units.

The semantic values may be data values that are determined or derived based on the semantic interpretation generator's interpretation of the NL input 140. In some embodiments, the determining and instantiating of the semantic type are performed in a single step, or simultaneously (e.g., concurrently or in parallel).

The semantic interpretation 142 output by the semantic preprocessor 124 may be embodied as a data structure of the semantic type populated with the semantic values that are extracted or derived from the NL input 140. For example, the semantic interpretation 142 may be embodied as a word graph or lattice. While shown in FIG. 2 as a component of the semantic preprocessor 124, in some embodiments, the semantic interpretation generator 216 may be embodied as a separate module from the semantic preprocessor 124 and communicatively coupled to the semantic preprocessor 124, or, where there are multiple semantic preprocessors, to each of the semantic preprocessors 124.

The semantic values may be obtained directly from the syntactic parse of the NL input 140 or determined as a result of the semantic interpretation generator 216 executing some computer operation, such as a mathematical calculation to determine a date value, a data acquisition process to obtain geographic location data (from, e.g., a Global Positioning System or GPS of the computing system 100), or a logical operation to relate the reference expression 218 or a semantic unit thereof to a concrete data value. For example, if the reference expression 218 or a semantic unit thereof is "half a mile going north on 101 past Embarcadero," the semantic interpretation generator 216 may execute a number of computer operations to determine the exact geographic location to which the reference expression 218 or semantic unit relates at the current moment in time. Such computer operations may include obtaining GPS location data for the VPA 110's current location, translating "half a mile going north" to a numerical value, and adding the numerical value to the current GPA location. As another example, if the reference expression 218 or semantic unit is "the child of my father's brother," the semantic interpretation generator 216 may traverse a hierarchical data structure representing a family tree to determine the exact name of the child to which the reference expression 218 or semantic unit refers.

The process of associating reference expressions 218 or semantic units thereof with semantic types may be referred to herein as "semantic type instantiation" or "semantic interpretation." The semantic interpretation performed by the semantic preprocessor(s) 124 may precede a traditional sentence-level semantic parsing operation or may be performed concurrently with or as part of sentence-level semantic parsing, in different embodiments of the VPA 110.

Where there are multiple semantic preprocessors 124, each semantic preprocessor 124 may have a separate semantic preprocessor model 150 and the semantic preprocessors 124 may preprocess the natural language input in parallel, in series, a combination thereof, or according to a hierarchical structure, which may be predefined (e.g., by the semantic preprocessor models 150, the VPA model 152, the domain model 154, or by the VPA 110).

The semantic preprocessors 124 and their corresponding preprocessor models 150 may be generic, domain-specific, and/or user-specific. For example, in an embodiment, a generic semantic preprocessor 124 may have a semantic preprocessor model 150 that includes defined semantic types for numbers, dates, currency, and/or other generic entities that include numerical terms. For example, a generic semantic preprocessor 124 directed specifically to preprocessing dates may have a semantic type having a "Day, Month, Year" structure with corresponding attributes. Further, such a semantic preprocessor 124 may be able to preprocess terms such as "yesterday," "tomorrow," "next Friday," "in two days," "last month," and other relative terms (e.g., based on the context for "today's" date, which may be determined by the multi-modal user interface 120 based on sensor inputs), or by querying the computer on which VPA 110 is running. Similarly, another generic semantic preprocessor 124 may have a semantic preprocessor model 150 that includes defined semantic types for spelling or typographical errors, spoken disfluencies (e.g., "uhm," "hmm," throat clearing, inadvertent mumbling, etc.), and/or other corrections.

A domain-specific semantic preprocessor 124 (e.g., related to cinema) may be associated with a domain-specific semantic preprocessor model 150 that defines semantic types for actors names, film titles, production staff information, media type, and other cinematic entities. A user-specific semantic preprocessor 124 may have a user-specific preprocessor model 150 that includes, for example, an understanding of the user's family structure (e.g., the family tree), family nicknames, user preferences, and other user-specific information, and the semantic preprocessor model 150 may include semantic types associated with relevant user-specific reference expressions.

In some embodiments, a semantic preprocessor 124 or a group of semantic preprocessors 124 may create a number of different semantic interpretations 142 of a particular reference expression 218 and/or instantiate a number of different data structures each corresponding to a different semantic interpretation 142. In other words, the NL input 140 or a reference expression 218 may be interpreted differently based on different semantic preprocessor models 150. For example, the NL input 140 or a reference expression 218 may be interpreted by a generic preprocessor, a domain-specific preprocessor, and a user-specific preprocessor, in any appropriate order as may be defined for a particular application of the VPA 110.

The semantic interpretation 142 may be further analyzed by the same semantic preprocessor or another semantic preprocessor 124, to generate a different or more specific semantic interpretation 142. In other words, the semantic preprocessors 124 may analyze or preprocess the natural language input in a "nested" fashion in which the output of one preprocessor 124 is used as the input to another preprocessor 124.

In some embodiments, the semantic interpretation generator 216 combines the semantic interpretation 142 with the NL input (e.g., in a word graph) for downstream processing. For example, a "date" semantic preprocessor 124 may analyze the statement "How much equity will I have in my house at the start of next year?" identify "next year" as a reference expression corresponding to the "date" semantic type. As a result, the date semantic preprocessor 124 may determine the current year (e.g., 2014), add 1 year to the current year, assign a data value of 2015 as a semantic unit of the semantic interpretation 142 of "next year," and combine the semantic interpretation 142 (e.g., date(2015)) with the original NL input 140, to result in a modified version of the NL input 140 of: "How much equity will I have in my house at the start of 2015?" The modified NL input 140 may be further preprocessed by another semantic preprocessor 124 (or again by the first semantic preprocessor 124, depending on the particular semantic preprocessor model 150). The second semantic preprocessor 124 may identify "the start of 2015" as a reference expression 218 corresponding to the semantic interpretation "Date(01/01/

2015)" and combine the semantic interpretation 142 with the modified NL input 140 to arrive at: "How much equity will I have in my house at 01/01/2015?" Any number of iterations of such semantic preprocessing are possible in accordance with design of a particular preprocessor 124 and/or preprocessor model 150. Depending on the particular embodiment, the final semantic interpretation and/or any of the intermediate semantic interpretations 142 may be passed to the NLU 128 for further analysis and processing.

Code Example 1 below illustrates a simple example of a definition of a semantic type "Date," and, following that, a semantic grammar that can be used to link semantic units to the semantic type.

---
Code Example 1. Association of semantic type with syntax and semantics.
---
```
public class Date {
Public Date (DayOfMonth d, Month m, Year y) { ...}
(1)         [Date]
(2)             [Month] [DayofMonth], [Year]
(3)             Date [1] [0] [2]
(4)         [Date]
(5)             [DayofMonth] / [Month] / [Year]
(6)             Date [0] [1] [2]
```
---

In Code Example 1, the semantic type "Date" has three attributes: day of month, month, and year, which can be filled by arguments d, m, y, respectively. The notation [Date] in the grammar links the semantic type "Date" to a non-terminal node of the syntactic parse. Lines 2 and 5 of the grammar specify the syntax alternatives for the semantic type, Date, and lines 3 and 6 indicate the semantics. For example, in line 3, [1] indicates the month of January is in the first position, whereas in line 6, [1] indicates that the month of January is in the second position.

Code Example 2 below illustrates a simple example of a "DateRange" semantic type.

---
Code Example 2. DateRange semantic type.
---
```
public class DateRange {
  public DateRange (Date fromDate, Date toDate) { . . . }
  public DateRange select (DateRange date) { . . . } }
```
---

It should be appreciated that, depending on the embodiment of the VPA 110, a particular semantic type may include, for example, an overloaded constructor for use in instantiating an object, where each constructor is configured to accept a different set of arguments/parameters. As described above, the particular values for each of the arguments of the corresponding class may be determined based on the NL input 140 (e.g., the reference expression 218 or portions thereof), or derived using one or more additional computer operations.

In some embodiments, the VPA 110 may utilize the semantic interpretation 142 "in reverse," such that the VPA 110 can make references to the original NL input 140 when a reference to the semantic type is encountered. As such, in some embodiments, the semantic interpretations 142 generated by the semantic preprocessors 124 may be stored in memory or data storage of the computing system 100.

Figure 3:
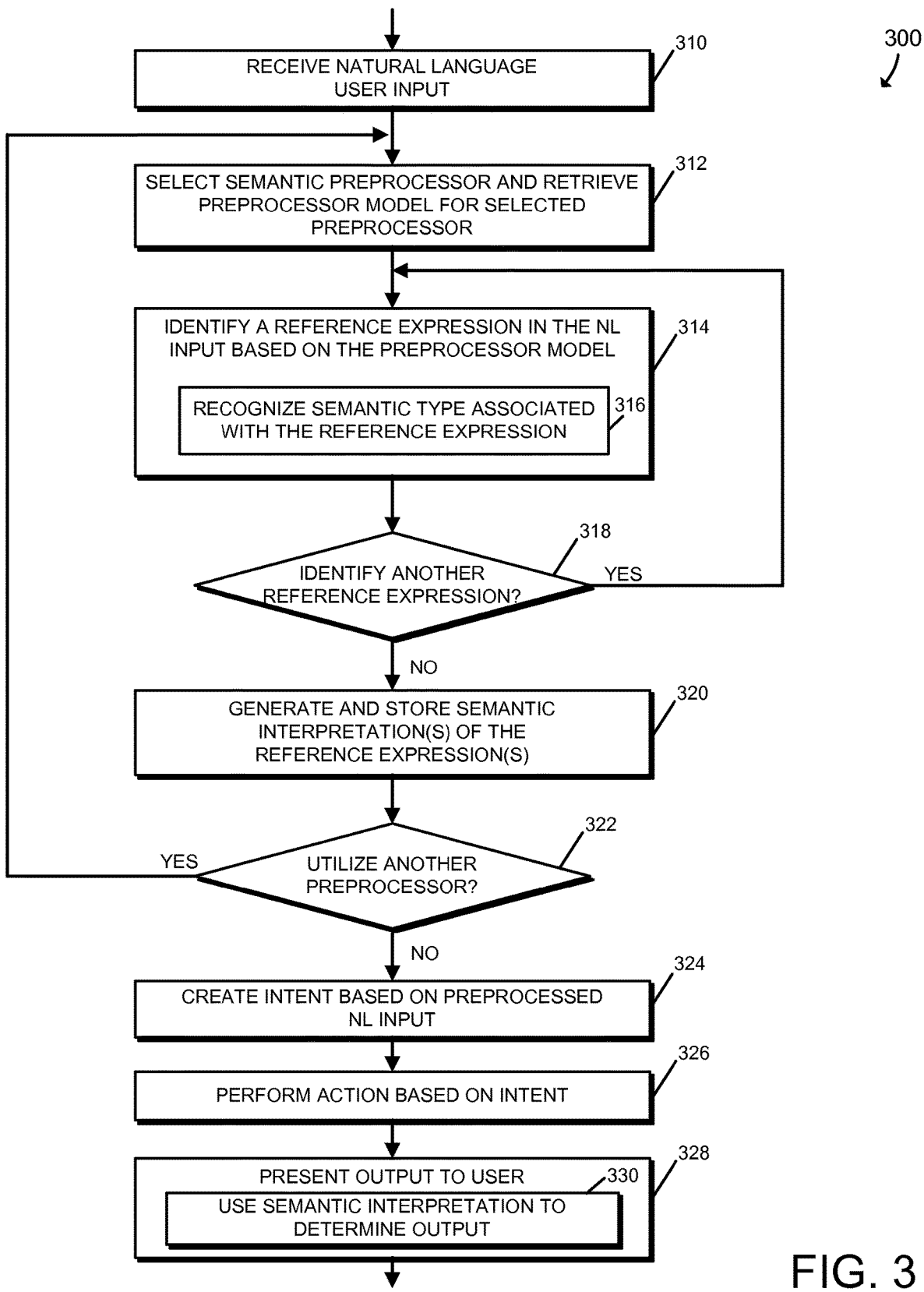
FIG. 3 is a simplified flow diagram of at least one embodiment of a method for providing virtual personal assistance with the computing system of FIG. 1.

Referring now to FIG. 3, a flow diagram provides an illustration of a method 300 by which embodiments of the VPA 110 may provide virtual personal assistance to a user of the computing system 100. The method 300 may be embodied as computerized programs, routines, logic and/or instructions executed by the computing system 100, for example by the VPA 110. At block 302, the VPA 110 receives a natural language user input (e.g., NL dialog input from the user). As used herein, "natural language" may refer to, among other things, words, phrases, verbal expressions, and/or combinations thereof, which are formulated by a human, a device, or a system in a fashion that is or is intended to approximate or simulate speech that normally arises in an unpremeditated fashion as the result of the innate facility for language possessed by the human intellect (as distinguished from, for example, structured computer programming languages or code). As used herein, "natural language" includes, among other things, non-word expressions and expressive interjections, such as "uh-huh," "unh-unh," "oh," "uh-oh," and "yay." Further, terms such as "dialog" and "conversation" may refer to, among other things, the use of natural language (e.g., spoken or written) in the context of a communicative exchange of information, ideas, opinions, sentiments, observations, questions and answers, statements and responses, or the like, where the communicative exchange involves instances of natural language expressed by a user and a computing device.

In block 310, in embodiments in which the VPA 110 receives natural language speech input, the VPA 110 may convert the speech input into text (e.g., via the speech recognition subsystem 122). Further, as described above, the natural language input may be preprocessed by one or more semantic preprocessors 124 of the VPA 110. Accordingly, at block 312, the VPA 110 selects a semantic preprocessor 124 and retrieves the corresponding semantic processor model 150. The selection of the semantic preprocessor 124 may be pre-specified according to the design of the VPA 110 and/or may result from a dependency of one preprocessor 124 on the output of another preprocessor 124, for example.

At block 314, the VPA 110 identifies a reference expression in the NL input 140, e.g., as the result of a syntactic parse. At block 316, the VPA recognizes a semantic type associated with the identified reference expression, based on its application of the retrieved preprocessor model 150 to the identified reference expression. As described above, the processes of blocks 314 and 316 may be performed simultaneously (e.g., concurrently or in parallel), in some embodiments. As described in greater detail above, each semantic preprocessor model 150 includes associations of semantic types with reference expressions, where the semantic types are semantically meaningful and therefore useful to the VPA 110. As indicated above, the semantic types relate to known semantics or known types of information that have been interpreted into canonical representations. That is, the semantic preprocessor model 150 may associate a reference expression with a defined semantic type having one or more attributes, which may be populated with semantic values (e.g., data values) that are extracted or derived from the reference expression 218.

At block 318, the VPA 110 determines whether to identify another reference expression in the NL input 140. This determination may be made by the VPA 110 by a particular preprocessor 124. For example, a "number" preprocessor may iteratively look for all of the reference expressions in the NL input 140 that appear to refer to a numerical value, and then associated the "Number" semantic type with each such reference expression. If the VPA is to identify another reference expression, the method 300 returns to block 314.

At block 320, the VPA 110 generates and stores one or more semantic interpretations 142 of the reference expression(s) analyzed at blocks 314, 316. In particular, the semantic preprocessors 124 may create the semantic interpretations 142, transmit/pass the semantic interpretations 142 to the natural language understanding module 128 of the VPA 110 and/or store the semantic interpretations 142 (e.g., for future use). To create the semantic interpretations 142, the VPA 110 may determine the data values for the attributes of the identified semantic type based on the semantic units extracted or derived from the reference expression 218. For example, the VPA 110 may determine "2010" to be the data value for an attribute of a corresponding "number" semantic type. Further, as described above, the VPA 110 may instantiate or otherwise create a data structure of the defined semantic type and including the assigned attributes (e.g., a Java object of a class corresponding with the semantic type). Additionally, in some embodiments, the VPA 110 may combine one or more semantic interpretations 142 created by the selected semantic preprocessor 124 with the reference expression 218 or the NL input 140, which may be further preprocessed by another semantic preprocessor 124 or analyzed by the VPA engine 126, as described above.

At block 322, the VPA 110 determines whether to utilize another semantic preprocessor 124 to analyze the natural language input obtained at block 310. For example, another semantic preprocessor 124 may be used to analyze the same reference expression previously identified or another reference expression of the natural language input 140. If the VPA 110 determines to preprocess the natural language input 140 with another semantic preprocessor 124, the method 300 returns to block 312 and the VPA 110 executes blocks 312-320 for that other semantic preprocessor 124 as described above. In other words, multiple semantic preprocessors 124 may preprocess the natural language input in parallel, in series, a combination thereof, or according to another hierarchical structure as described above.

If the VPA 110 determines at block 322 not to utilize another semantic preprocessor 124 (i.e., the preprocessing is complete), the method 300 advances to block 324 at which the VPA 110 creates an input intent 144 based on the semantic interpretation(s) 142 that have been created by the preprocessor(s) 124. That is, the VPA 110 or more particularly the NLU 128 analyzes the semantic interpretations 142 and incorporates one or more of the semantic interpretations 142 into an input intent 144. At block 326, the VPA 110 analyzes the input intent 144 and executes any system operations (e.g., task flows) that are needed to prepare a system response to the input intent 144. As a result of such operations, the VPA 110 or more particularly the reasoner 130 generates an output intent 146.

At block 328, the VPA 110 presents an output to the user of the computing system 100 based on the output intent 146. At block 330, the VPA 110 uses the previously-created semantic interpretation 142 (e.g., word graph) to determine the content of the output. For example, the VPA 110 may traverse the word graph "in reverse" to determine the reference expression associated with a semantic type, and use the reference expression in its presentation of the output. In this way, the VPA 110 can, for example, repeat user-specific terminology or phrasing in its output and therefore "personalize" its dialog with the VPA user. As an example, whereas a semantic preprocessor 124 may resolve "the child of your father's brother" to "Jack Jones" in order to execute a task, the VPA 110 may at a later time reference the semantic interpretation 142 to retrieve and use the phrase the same phrase used by the VPA user, e.g., "the child of your father's brother" in presenting appropriate output to the user.

Example Usage Scenarios

Figure 4:
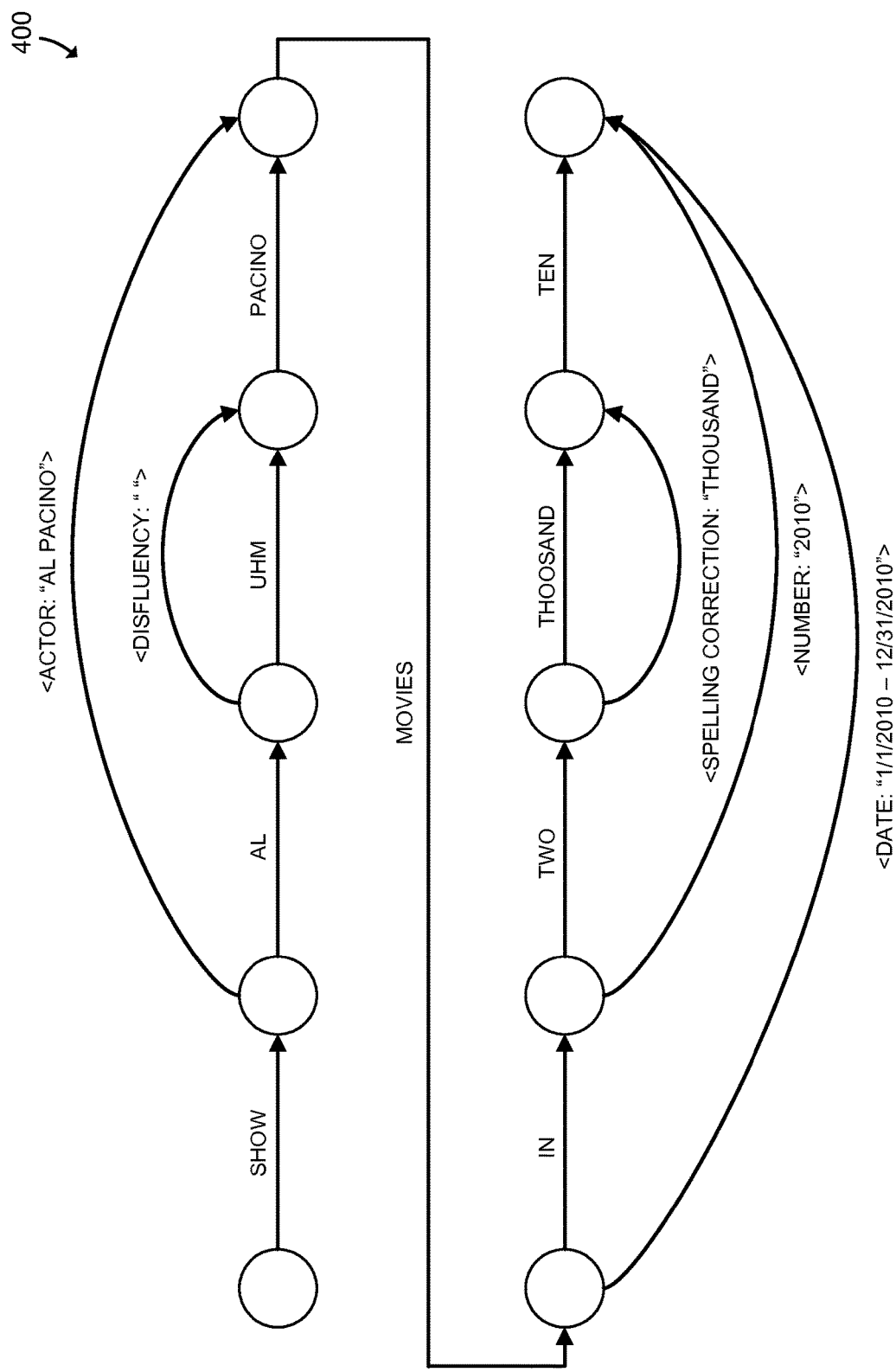
FIG. 4 is a simplified diagram of at least one embodiment of a word graph that may be generated by the computing system of FIG. 1.

Referring now to FIG. 4, an example of data structure embodying a number of semantic interpretations of a natural language input is shown. The illustrative data structure is embodied as a word graph 400. The illustrative word graph 400 is a structured representation of the natural language input 140 and the semantic interpretations 142 that are created by the semantic preprocessors 124. For convenience, the natural language input shown in FIG. 4 is described herein as being preprocessed by a single preprocessor 124. However, it should be appreciated that the word graph 400 may be generated based on the semantic interpretations of a single semantic preprocessor 124 (e.g., based on one or more iterations) or multiple semantic preprocessors 124 (e.g., in parallel, in series, or according to another suitable order).

As shown, the natural language input includes the phrase "Show Al uhm Pacino movies in two thoosand ten." The word graph 400 identifies each of the possible reference expressions (semantic units) of the natural language input, where a reference expression (semantic unit) is indicated by the links between the nodes of the word graph 400. For example, "Al uhm Pacino" may be one reference expression (semantic unit) and "Al Pacino" may be another reference expression (semantic unit). Similarly, "thousand," "two thousand ten," and "in two thousand ten" may be considered different reference expressions (semantic units), each of which may be processed by a different semantic preprocessor 124.

In the illustrated example, the semantic preprocessor 124 identifies the term "uhm" as a reference expression (semantic unit) and associates it with a semantic type "disfluency" with no attribute. Subsequently or contemporaneously, the semantic preprocessor 124 identifies the term "thoosand" as a reference expression (semantic unit) corresponding to a semantic type "spelling correction" and having the attribute "thousand." As such, the semantic preprocessor 124 generates the data structure associated with the semantic interpretation "spelling_correction(thousand)" and combines the semantic interpretation with the natural language input to get the natural language text "Show Al Pacino movies in two thousand ten."

Thereafter, the semantic preprocessor 124 identifies the term "Al Pacino" as a reference expression (semantic unit) corresponding with a semantic type "actor" and having the attribute "Al Pacino." As such, the semantic preprocessor 124 generates the data structure associated with the semantic interpretation "actor(Al Pacino)." Further, the semantic preprocessor 124 identifies the reference expression "two thousand ten" as corresponding with the semantic type "number" and having the attribute "2010." Accordingly, the semantic preprocessor 124 generates the data structure associated with the semantic interpretation "number(2010)." Further, the semantic preprocessor 124 identifies the term "in two thousand ten" or "in 2010" (i.e., depending on whether the "number" semantic interpretation was combined/merged with the natural language text) as corresponding with the semantic type "date" and having the attribute "1/1/2010-12/31/2010." As such, the semantic preprocessor 124 similarly generates the data structure associated with the semantic interpretation "date(1/1/2010-12/31/2010)." The semantic preprocessor 124 then provides the word graph 400 to the NLU module 128, for further analysis and processing as described above.

Implementation Examples

Referring now to FIG. 5, a simplified block diagram of an exemplary computing environment 500 for the computing system 100, in which the VPA 110 may be embodied, is shown. The illustrative environment 500 includes a computing device 510, which may be in communication with one or more other computing devices 532 via one or more networks 530. Illustratively, a portion 110A of the VPA 110 is local to the computing device 510, while another portion 110B is distributed across one or more of the other computing systems or devices 532 that are connected to the networks 530. For example, the local portion 110A may include the semantic preprocessor 124, or even just one or a few of many semantic preprocessors 124 that are used by the VPA 110.

In other embodiments, however, the VPA 110 may be located entirely on the computing device 510. In some embodiments, portions of the VPA 110 may be incorporated into other systems or interactive software applications. Such applications or systems may include, for example, operating systems, middleware or framework (e.g., application programming interface or API) software, and/or user-level applications software (e.g., another interactive software application, such as a search engine, web browser or web site application, or a user interface for a computing device). Such applications may also include vehicle "infotainment" systems, vehicle-based VPA applications, "smart" devices (e.g., smart TVs and other smart appliances), and/or others.

The illustrative computing device 510 includes at least one processor 512 (e.g. a controller, microprocessor, microcontroller, digital signal processor, etc.), memory 514, and an input/output (I/O) subsystem 516. Although not specifically shown, embodiments of the processor 512 may include separate baseband and applications processors. Features of the baseband and applications processors may be located on the same or different hardware devices (e.g., a common substrate). The baseband processor interfaces with other components of the computing device 510 and/or external components to provide, among other things, wireless communication services, such as cellular, BLUETOOTH, WLAN, and/or other communication services. In general, the applications processor handles processing required by software and firmware applications running on the computing device 510, as well as interfacing with various sensors and/or other system resources. However, it should be understood that features typically handled by the baseband processor may be handled by the applications processor and vice versa, in some embodiments.

The computing device 510 may be embodied as any type of computing device such as a personal computer or mobile device (e.g., desktop, laptop, tablet, smart phone, body-mounted or wearable device, etc.), a server, an enterprise computer system, a network of computers, a combination of computers and other electronic devices, or other electronic devices. Although not specifically shown, it should be understood that the I/O subsystem 516 typically includes, among other things, an I/O controller, a memory controller, and one or more I/O ports. The processor 512 and the I/O subsystem 516 are communicatively coupled to the memory 514. The memory 514 may be embodied as any type of suitable computer memory device (e.g., volatile memory such as various forms of random access memory).

The I/O subsystem 516 is communicatively coupled to a number of components including a user interface subsystem 520. The user interface subsystem 520 includes one or more user input devices (e.g., a microphone, a touchscreen, keyboard, virtual keypad, etc.) and one or more output devices (e.g., audio speakers, displays, LEDs, etc.). The I/O subsystem 516 is also communicatively coupled to one or more storage media 518, one or more sensing devices 522, and a communications subsystem 524. The storage media 518 may include one or more hard drives or other suitable persistent data storage devices (e.g., flash memory, memory cards, memory sticks, and/or others). Illustratively, portions of the semantic preprocessor models 150A, the VPA model 152A, and the domain model 154A reside in the storage media 518, while other portions of the semantic preprocessor models 150B, the VPA model 152B, and the domain model 154B reside in storage media of one or more other computing devices 532. In some embodiments, portions of systems software (e.g., an operating system, etc.), framework/middleware (e.g., APIs, object libraries, etc.), and/or other components reside at least temporarily in the storage media 518 and may be copied to the memory 518 during operation of the computing device 510 for faster processing or other reasons. The sensing devices 522 may include, for example, cameras, microphones, motion sensors, pressure sensors, kinetic sensors, temperature sensors, biometric sensors, and/or others that are integrated with or in communication with the computing device 510, in some embodiments.

The communication subsystem 524 may communicatively couple the computing device 510 to other computing devices and/or systems by, for example, a cellular network, a local area network, wide area network (e.g., Wi-Fi), personal cloud, virtual personal network (e.g., VPN), enterprise cloud, public cloud, Ethernet, and/or public network such as the Internet. The communication subsystem 524 may, alternatively or in addition, enable shorter-range wireless communications between the computing device 510 and other computing devices, using, for example, BLUETOOTH and/or Near Field Communication (NFC) technology. Accordingly, the communication subsystem 524 may include one or more optical, wired and/or wireless network interface subsystems, cards, adapters, or other devices, as may be needed pursuant to the specifications and/or design of the particular computing device 510. Additionally, the communication subsystem 524 may include a telephony subsystem, which enables the computing device to provide telecommunications services (e.g., via the baseband processor). The telephony subsystem generally includes a longer-range wireless transceiver, such as a radio frequency (RF) transceiver, and other associated hardware (e.g., amplifiers, etc.).

The other computing device(s) 540 may be embodied as any suitable type of computing device capable of performing the functions described herein, such as any of the aforementioned types of devices or other electronic devices. For example, in some embodiments, the other computing device(s) 540 may include one or more server computers including storage media 548, which may be used to store portions of the preprocessor model(s) 150B, the VPA model 152B, the domain model 154B, and/or other data. The illustrative computing device 540 also includes a user interface subsystem 550, one or more sensing device(s) 552 and a communication subsystem 554. Components of the computing device 540 having the same or similar name as components of the computing device 510 may be embodied similarly to those as described above and therefore, the description is not repeated here. The computing system 500 may include other components, sub-components, and devices not illustrated in FIG. 5 for clarity of the description. In general, the components of the computing system 500 are communicatively coupled as shown in FIG. 5 by signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

In an example 1, a method for recognizing natural language user input as a reference to a known semantic type includes, with a virtual personal assistant embodied in at least one computing device: receiving an instance of natural language user input; identifying a reference expression in the natural language user input, the reference expression comprising less than the entire instance of natural language input, the reference expression indicating a type of information usable by the VPA to execute an action but not indicating the action; with a semantic preprocessor model defining a plurality of semantic types each having a semantic meaning useful to the virtual personal assistant: recognizing the reference expression as referring to a semantic type in the semantic preprocessor model; and creating a semantic interpretation of the reference expression, the semantic interpretation comprising a structured representation of the semantic meaning of the reference expression, the structured representation comprising the semantic type; and accessing the one or more semantic interpretations by a natural language understanding module of the virtual personal assistant.

An example 2 includes the subject matter of example 1 and includes, with the virtual personal assistant, creating an intent based on the semantic interpretation of the reference expression. An example 3 includes the subject matter of example 2, and includes, with the virtual personal assistant, executing an action in response to the intent. An example 4 includes the subject matter of example 3, and includes presenting output representing a result of the action executed by the virtual personal assistant. An example 5 includes the subject matter of any of the preceding examples, and includes determining a plurality of semantic interpretations of the reference expression, selecting a semantic interpretation of the plurality of semantic interpretations of the reference expression, and processing the selected semantic interpretation by the natural language understanding module of the virtual personal assistant. An example 6 includes the subject matter of any of the preceding examples, and includes identifying a plurality of different reference expressions in the instance of natural language input, determining a semantic interpretation of each of the reference expressions, and passing each of the semantic interpretations to the natural language understanding module. An example 7 includes the subject matter of any of the preceding examples, and includes extracting a semantic unit from the reference expression and associating the extracted semantic unit with the semantic type in the semantic interpretation. An example 8 includes the subject matter of any of the preceding examples, and includes deriving a semantic unit from the reference expression by executing one or more computer operations and associating the derived semantic unit with the semantic type in the semantic interpretation. An example 9 includes the subject matter of any of the preceding examples, wherein the instance of natural language user input comprises natural language speech, and the method comprises converting the natural language speech to natural language text and identifying the reference expression in the natural language text. An example 10 includes the subject matter of any of the preceding examples, and includes combining the semantic interpretation with the instance of natural language user input and passing the combination of the semantic interpretation and the instance of natural language user input to the natural language understanding module.

An example 11 includes the subject matter of any of the preceding examples, and includes: combining the semantic interpretation with the instance of natural language input to generate a preprocessed instance of natural language input; identifying a second reference expression in the preprocessed instance of natural language input; determining a semantic interpretation of the second reference expression based on a different semantic preprocessor model; and passing the semantic interpretation of the second reference expression to the natural language understanding module.

An example 12 includes the subject matter of any of the preceding examples, and includes: identifying a second reference expression in the instance of natural language input; determining a semantic interpretation of the second reference expression based on a different semantic preprocessor model; and passing the semantic interpretation of the second reference expression to the natural language understanding module. An example 13 includes the subject matter of any of the preceding examples, and includes determining the semantic interpretation of the reference expression by instantiating a data structure of the semantic type, the data structure having an attribute, and populating the attribute with a data value obtained from the reference expression. An example 14 includes the subject matter of any of the preceding examples, and includes determining the data value based on a current context of the virtual personal assistant.

An example 15 includes a virtual personal assistant including: a user interface module to receive spoken natural language user input; a semantic preprocessor to: identify a reference expression in the spoken natural language input; and with a semantic preprocessor model that associates reference expressions with semantic types each having a semantic meaning useful to the virtual personal assistant: recognize the reference expression as referring to at least one of the semantic types; and create one or more semantic interpretations of the reference expression, the one or more semantic interpretations each comprising one of the semantic types; a natural language understanding module to create an intent based on the one or more semantic interpretations; a reasoner module to execute an action based on the intent; and a natural language generator module to present natural language speech output representing a result of the action.

An example 16 includes the subject matter of example 15, wherein the virtual personal assistant is to create a structured representation of the one or more semantic interpretations of the reference expression. An example 17 includes the subject matter of example 15 or example 16, wherein the semantic preprocessor is a first semantic preprocessor and comprising a second semantic preprocessor to: identify a second reference expression in the natural language input; determine one or more semantic interpretations of the second reference expression based on a different semantic preprocessor model; and pass the one or more semantic interpretations of the second reference expression to the natural language understanding module. An example 18 includes the subject matter of any of examples 15-17, wherein: the semantic preprocessor is to combine the one or more semantic interpretations with the natural language user input to generate a preprocessed natural language input; and the natural language understanding module is to receive the preprocessed natural language input. An example 19 includes the subject matter of any of examples 15-18, wherein the semantic preprocessor comprises a first semantic preprocessor to combine the one or more semantic interpretations with the natural language user input to generate a preprocessed natural language input, and comprising: a second semantic preprocessor to: identify a second reference expression in the preprocessed natural language input; determine one or more semantic interpretations of the second reference expression based on a second semantic preprocessor model; and provide the one or more semantic interpretations of the second reference expression to the natural language understanding module. An example 20 includes the subject matter of any of examples 15-19, wherein the semantic preprocessor is to: associate the reference expression with a semantic type of the semantic preprocessor model; and determine the one or more semantic interpretations of the reference expression by instantiating a data structure of the semantic type, the data structure having an attribute, and populating the attribute with a portion of the reference expression. An example 21 includes the subject matter of any of examples 15-20, wherein the virtual personal assistant is to represent the one or more semantic interpretations by a lattice data structure or a word graph data structure. An example 22 includes the subject matter of any of examples 15-21, wherein the natural language generator module is to use the semantic interpretation to generate natural language speech output comprising at least a portion of the reference expression.

An example 23 includes a semantic preprocessor for a virtual personal assistant, the semantic preprocessor to recognize natural language user input as a reference to a known semantic type having a semantic meaning that is useful to the virtual personal assistant, the semantic preprocessor embodied in one or more computer accessible media and executable to cause a computing device to: receive natural language speech input; identify a reference expression in the natural language speech input, the reference expression comprising less than the entire natural language speech input; with a semantic preprocessor model comprising associations of reference expressions with known semantic types, create a plurality of semantic interpretations of the reference expression, each of the semantic interpretations comprising a different known semantic type; and pass the plurality of semantic interpretations to a natural language understanding module of the virtual personal assistant, the natural language understanding module to select a semantic interpretation from the plurality of semantic interpretations and create an intent based on the selected semantic interpretation. An example 24 includes the subject matter of example 23, wherein the semantic preprocessor is to determine each of the plurality of semantic interpretations based on a different semantic preprocessor model. An example 25 includes the subject matter of example 24, wherein each of the different semantic preprocessor models associates the reference expression with a different semantic type. An example 26 includes the subject matter of any of examples 23-25, wherein the semantic preprocessor is to instantiate a data structure of the defined semantic type having an attribute, calculate a data value based on the reference expression, and populating the attribute with the calculated data value. An example 27 includes the subject matter of any of examples 23-26, wherein at least one of the associations of reference expressions with known semantic types is defined by a user of the virtual personal assistant. An example 28 includes the subject matter of any of examples 23-27, wherein the semantic preprocessor is to identify the reference expression as a result of a syntactic parse, and link the reference expression with a semantic type using a synchronous context-free grammar General Considerations In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A method for a computing device to pre-process natural language speech captured by an audio input device to improve accuracy of a parser, the method comprising:

with syntactic parser computer instructions, identifying a plurality of syntactic units in an instance of natural language input;

with unit-level semantic parser computer instructions, outputting unit-level semantic interpretations each comprising a canonical representation of a particular subset of the plurality of syntactic units and a data value associated with the canonical representation of the particular subset of the plurality of syntactic units;

with sentence-level semantic parser computer instructions, determining one of the plurality of unit-level semantic interpretations output by the unit-level semantic parser computer instructions to include in a sentence-level semantic interpretation of the instance of natural language input;

with reasoner computer instructions, using the sentence-level semantic interpretation of the instance of natural language input to determine an action to be executed by the computing device;

causing the computing device to execute the action.

2. The method of claim 1, comprising using the data structure outputted by the unit-level semantic parser computer instructions as input to another unit-level semantic parser.

3. The method of claim 1, comprising using a second data structure outputted by second unit-level semantic parser computer instructions as input to the sentence-level semantic parser to determine a second semantic interpretation of the same instance of natural language input.

4. The method of claim 1, comprising executing the syntactic parser computer instructions to verify a data structure outputted by the unit-level semantic parser computer instructions.

5. The method of claim 1, comprising concurrently identifying a plurality of candidate canonical representations of syntactic units of the same instance of natural language input and using at least one of the candidate canonical representations to create the data structure.

6. The method of claim 1, comprising iteratively identifying a plurality of candidate canonical representations of syntactic units of the same instance of natural language input and using at least one of the candidate canonical representations to iteratively build the data structure.

7. The method of claim 1, wherein the syntactic unit includes a disfluency or a pause.

8. The method of claim 1, wherein the canonical representation of the syntactic unit comprises a type of currency and the data value comprises an amount of the currency.

9. The method of claim 1, wherein the canonical representation of the syntactic unit comprises a type of account number and the data value comprises an account number.

10. The method of claim 1, wherein the data value is extracted from the same instance of natural language input or derived from the same instance of natural language input by executing a computer operation.

11. The method of claim 1, wherein the unit-level semantic parser interfaces with a user-specific model to identify the canonical representation of the syntactic unit.

12. The method of claim 1, comprising using the data structure as a reference to a portion of the same instance of natural language input.

13. The method of claim 1, comprising using the semantic interpretation to personalize a natural language dialog involving the computing device and a person interacting with the computing device.

14. The method of claim 1, comprising using the semantic interpretation to create an intent for a virtual personal assistant computer system.

15. A system for enabling a computing device to pre-process natural language speech captured by an audio input device to improve accuracy of a parser, the method comprising:

with syntactic parser computer instructions, identifying a plurality of syntactic units in an instance of natural language input;

with unit-level semantic parser computer instructions, outputting unit-level semantic interpretations each comprising a canonical representation of a particular subset of the plurality of syntactic units and a data value associated with the canonical representation of the particular subset of the plurality of syntactic units;

with sentence-level semantic parser computer instructions, determining one of the plurality of unit-level semantic interpretations output by the unit-level semantic parser computer instructions to include in a sentence-level semantic interpretation of the instance of natural language input;

with reasoner computer instructions, using the sentence-level semantic interpretation of the instance of natural language input to determine an action to be executed by the computing device;

causing the computing device to execute the action.

16. The system of claim 15, wherein the instructions, when executed by the one or more processors, cause the one or more processors to perform operations comprising using the data structure outputted by the unit-level semantic parser computer instructions as input to another unit-level semantic parser.

17. The system of claim 15, wherein the instructions, when executed by the one or more processors, cause the one or more processors to perform operations comprising using a second data structure outputted by second unit-level semantic parser computer instructions as input to the sentence-level semantic parser to determine a second semantic interpretation of the same instance of natural language input.

18. The system of claim 15, comprising wherein the instructions, when executed by the one or more processors, cause the one or more processors to perform operations comprising executing the syntactic parser computer instructions to verify a data structure outputted by the unit-level semantic parser computer instructions.

19. The system of claim 15, wherein the instructions, when executed by the one or more processors, cause the one or more processors to perform operations comprising concurrently identifying a plurality of candidate canonical representations of syntactic units of the same instance of natural language input and using at least one of the candidate canonical representations to create the data structure.

20. The system of claim 15, wherein the instructions, when executed by the one or more processors, cause the one or more processors to perform operations comprising iteratively identifying a plurality of candidate canonical representations of syntactic units of the same instance of natural language input and using at least one of the candidate canonical representations to iteratively build the data structure.

21. The system of claim 15, wherein the syntactic unit includes a disfluency or a pause.

22. The system of claim 15, wherein the canonical representation of the syntactic unit comprises a type of currency and the data value comprises an amount of the currency.

23. The system of claim 15, wherein the canonical representation of the syntactic unit comprises a type of account number and the data value comprises an account number.

24. The system of claim 15, wherein the data value is extracted from the same instance of natural language input or derived from the same instance of natural language input by executing a computer operation.

25. The system of claim 15, wherein the unit-level semantic parser interfaces with a user-specific model to identify the canonical representation of the syntactic unit.

26. The system of claim 15, wherein the instructions, when executed by the one or more processors, cause the one or more processors to perform operations comprising using the data structure as a reference to a portion of the same instance of natural language input.

27. The system of claim 15, wherein the instructions, when executed by the one or more processors, cause the one or more processors to perform operations comprising using the semantic interpretation to personalize a natural language dialog involving the computing device and a person interacting with the computing device.

28. The system of claim 15, wherein the instructions, when executed by the one or more processors, cause the one or more processors to perform operations comprising using the semantic interpretation to create an intent for a virtual personal assistant computer system.

29. A computer program product for enabling a computing device to pre-process natural language speech captured by an audio input device to improve accuracy of a parser, the computer program product comprising one or more non-transitory computer readable storage media storing instructions which, when executed by one or more processors, cause the one or more processors to perform operations comprising:
- with syntactic parser computer instructions, identifying a plurality of syntactic units in an instance of natural language input;
- with unit-level semantic parser computer instructions, outputting unit-level semantic interpretations each comprising a canonical representation of a particular subset of the plurality of syntactic units and a data value associated with the canonical representation of the particular subset of the plurality of syntactic units;
- with sentence-level semantic parser computer instructions, determining one of the plurality of unit-level semantic interpretations output by the unit-level semantic parser computer instructions to include in a sentence-level semantic interpretation of the instance of natural language input;
- with reasoner computer instructions, using the sentence-level semantic interpretation of the instance of natural language input to determine an action to be executed by the computing device;
- causing the computing device to execute the action.

30. The computer program product of claim 29, wherein the instructions, when executed by the one or more processors, cause the one or more processors to perform operations comprising using the data structure outputted by the unit-level semantic parser computer instructions as input to another unit-level semantic parser.

31. The computer program product of claim 29, wherein the instructions, when executed by the one or more processors, cause the one or more processors to perform operations comprising using a second data structure outputted by second unit-level semantic parser computer instructions as input to the sentence-level semantic parser to determine a second semantic interpretation of the same instance of natural language input.

32. The computer program product of claim 29, wherein the instructions, when executed by the one or more processors, cause the one or more processors to perform operations comprising executing the syntactic parser computer instructions to verify a data structure outputted by the unit-level semantic parser computer instructions.

33. The computer program product of claim 29, wherein the instructions, when executed by the one or more processors, cause the one or more processors to perform operations comprising concurrently identifying a plurality of candidate canonical representations of syntactic units of the same instance of natural language input and using at least one of the candidate canonical representations to create the data structure.

34. The computer program product of claim 29, wherein the instructions, when executed by the one or more processors, cause the one or more processors to perform operations comprising iteratively identifying a plurality of candidate canonical representations of syntactic units of the same instance of natural language input and using at least one of the candidate canonical representations to iteratively build the data structure.

35. The computer program product of claim 29, wherein the syntactic unit includes a disfluency or a pause.

36. The computer program product of claim 29, wherein the canonical representation of the syntactic unit comprises a type of currency and the data value comprises an amount of the currency.

37. The computer program product of claim 29, wherein the canonical representation of the syntactic unit comprises a type of account number and the data value comprises an account number.

38. The computer program product of claim 29, wherein the data value is extracted from the same instance of natural language input or derived from the same instance of natural language input by executing a computer operation.

39. The computer program product of claim 29, wherein the unit-level semantic parser interfaces with a user-specific model to identify the canonical representation of the syntactic unit.

40. The computer program product of claim 29, wherein the instructions, when executed by the one or more processors, cause the one or more processors to perform operations comprising using the data structure as a reference to a portion of the same instance of natural language input.

41. The computer program product of claim 29, wherein the instructions, when executed by the one or more processors, cause the one or more processors to perform operations comprising using the semantic interpretation to personalize a same instance of natural language dialog involving the computing device and a person interacting with the computing device.

42. The computer program product of claim 29, wherein the instructions, when executed by the one or more processors, cause the one or more processors to perform operations comprising using the semantic interpretation to create an intent for a virtual personal assistant computer system.

* * * * *